US006997521B2

(12) United States Patent
Jensen et al.

(10) Patent No.: US 6,997,521 B2
(45) Date of Patent: Feb. 14, 2006

(54) PARKING AND SERVICE BRAKE CONTROL SYSTEM FOR A VEHICLE

(75) Inventors: Jeffrey E. Jensen, Naperville, IL (US); Sameer Marathe, Oswego, IL (US); Scott A. Marks, Plainfield, IL (US); Bradford J. Holt, Peoria, IL (US); Kevin L. Fuller, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/236,165

(22) Filed: Sep. 6, 2002

(65) Prior Publication Data

US 2004/0046443 A1   Mar. 11, 2004

(51) Int. Cl.
*B60T 13/74* (2006.01)

(52) U.S. Cl. .............................. 303/3; 701/70; 303/15; 303/20

(58) Field of Classification Search .............. 303/113.4, 303/20, 22.4, 122, 11, 7, 9, 3, 5, 13, 15, 155; 701/70
See application file for complete search history.

(56) References Cited

U.S. PATENT DOCUMENTS

| | | | | |
|---|---|---|---|---|
| 3,565,220 A | * | 2/1971 | Lammers et al. ............... 303/5 |
| 4,339,154 A | * | 7/1982 | Duttarer et al. ................. 303/3 |
| 4,561,527 A | | 12/1985 | Nakamoto et al. | |
| 5,052,532 A | | 10/1991 | Plate | |
| 5,131,288 A | | 7/1992 | Barlas | |
| 5,139,315 A | | 8/1992 | Walenty et al. | |
| 5,219,049 A | | 6/1993 | Unterborn | |
| 5,423,600 A | | 6/1995 | Riddiford et al. | |
| 5,785,157 A | | 7/1998 | Scott et al. | |
| 5,895,098 A | | 4/1999 | Stacey et al. | |
| 5,954,407 A | | 9/1999 | Schramm et al. | |
| 5,961,190 A | | 10/1999 | Brandmeier et al. | |
| 5,962,931 A | | 10/1999 | Maron et al. | |
| 6,139,468 A | | 10/2000 | Goates et al. | |
| 6,203,115 B1 | | 3/2001 | Rosendahl et al. | |
| 6,276,763 B1 | | 8/2001 | Isono et al. | |
| 6,299,261 B1 | | 10/2001 | Weiberle et al. | |
| 6,367,886 B1 | | 4/2002 | Shaw | |
| 6,390,571 B1 | | 5/2002 | Murphy | |
| 6,401,879 B1 | | 6/2002 | Drennen et al. | |
| 6,402,259 B1 | | 6/2002 | Corio et al. | |
| 6,405,838 B1 | | 6/2002 | Shaw | |
| 6,428,117 B1 | * | 8/2002 | Messersmith ................... 303/3 |
| 6,449,551 B1 | * | 9/2002 | Wrede .......................... 303/20 |
| 6,460,660 B1 | | 10/2002 | Shaw et al. | |
| 6,496,768 B1 | * | 12/2002 | Yamamoto .................... 303/20 |
| 6,550,598 B1 | | 4/2003 | Drennen | |
| 6,561,321 B1 | | 5/2003 | Klode et al. | |
| 6,586,927 B1 | | 7/2003 | Pfeil et al. | |
| 2001/0029408 A1 | | 10/2001 | Murray et al. | |
| 2001/0032042 A1 | | 10/2001 | Disser et al. | |
| 2004/0140710 A1 | | 7/2004 | Alvarez et al. | |

* cited by examiner

*Primary Examiner*—Melanie Torres

(57) ABSTRACT

A vehicle includes at least one wheel, a parking brake associated with the at least one wheel and a service brake associated with the at least one wheel, and a braking control system. The braking control system interprets operator on/off commands to the parking brake. The service brakes are actuated instead of or in addition to the parking brake when a parking brake application is ordered and the vehicle speed falls outside a preferred vehicle speed range. If the vehicle is stopped and the parking brake is engaged, the parking brake is not disengaged responsive to an operator command until the service brake condition is within a preferred ready range.

13 Claims, 3 Drawing Sheets

PARKING AND SERVICE BRAKE CONTROL SYSTEM FOR A VEHICLE

TECHNICAL FIELD

This invention relates to a braking control system for a vehicle and, more particularly, to a braking control system which controls a parking brake of the vehicle.

BACKGROUND

A vehicle such as a wheel loader, backhoe loader, on- or off-highway truck, or the like is normally equipped with a number of wheels. Generally, the wheels are mounted in pairs on an axle. A service brake of a known type is associated with at least one wheel or axle. A parking brake of a known type is also associated with at least one wheel or axle. The service and parking brakes are controlled by an operator. The service brake is generally designed to slow or stop a vehicle in motion. The parking brake is generally designed to hold a stopped vehicle in the stopped position.

Often, an operator will attempt to engage or actuate the parking brake while the vehicle is still moving. If the parking brake is repeatedly used incorrectly to stop the vehicle in this manner, wear of the parking brake components and possible brake failure may result. Therefore it is desirable to provide a method of slowing the vehicle and/or controlling an engagement of the parking brake so as to avoid undue damage to the parking brake.

Hydraulically operated service brakes are common in the industry. Such hydraulically operated brakes require a source of pressurized fluid in order to actuate and disengage the brakes. Proper braking force may not be available if the fluid is not pressurized. The initial start-up of the vehicle is an example of a situation in which fluid in the hydraulic system may not be pressurized. A "pre-fill" period is usually required for sufficient fluid pressure for operation to build up in the hydraulic system supplying the service brakes. If the parking brake is released before pre-fill is completed, the hydraulic service brakes may not be completely operative and the operator may experience a lack of braking force. It would be advantageous to prevent the parking brakes from being disengaged before the service brakes are pre-filled.

U.S. Pat. No. 5,052,532, issued Oct. 1, 1991 to John R. Plate (hereafter referenced as '532) discloses a brake system for a vehicle which includes a pump coupled to a service brake through a brake pedal valve and to a parking brake by a four-way solenoid valve which also couples the pump to a transmission disconnect valve. The '532 invention disconnects the vehicle's transmission so that the vehicle cannot be driven when the parking brake is engaged. However, the extra valve for the transmission disconnect requires extra manufacturing and maintenance effort and may unnecessarily complicate the vehicle's hydraulic system. Also, an operator may desire to engage the parking brake in certain situations to legitimately supplement the service brake, and '532 does not allow for such an application. Additionally, '532 does not monitor the condition of a service brake before allowing the parking brake to be disengaged.

In an embodiment of the present invention, a vehicle is disclosed. The vehicle includes a vehicle body, an operator cab located on the vehicle body, and a ground engaging system. The ground engaging system provides motive power to the vehicle body, and has at least one wheel, at least one service brake and at least one parking brake associated with the wheel, and a braking control system associated with the service brake and the parking brake. The braking control system includes a parking brake control, a speed sensor, and an electronic control module. The parking brake control is adapted to produce a parking brake signal responsive to an operator command. The speed sensor is adapted to produce a vehicle speed signal. The electronic control module is adapted to receive the parking brake signal and the vehicle speed signal and responsively control the service brake such that the service brake is actuated in response to the vehicle speed signal being outside a preferred vehicle speed range.

In an embodiment of the present invention, a braking system is disclosed. The braking system includes a service brake adapted to resist motion of a wheel, a parking brake adapted to resist motion of the wheel, a parking brake control adapted to produce a parking brake signal responsive to an operator command, a ground speed sensor adapted to produce a speed signal responsive to the motion of the wheel, and an electronic control module adapted to receive the parking brake signal and the speed signal and control the service brake responsive to the speed signal being outside a preferred speed range.

In an embodiment of the present invention, a braking system is disclosed. The braking system includes a parking brake adapted to resist motion of a wheel, a parking brake control adapted to produce a parking brake signal responsive to an operator command, a service brake sensor adapted to produce a service brake signal responsive to a ready condition of the service brake, and a parking brake indicator. The braking system also includes an electronic control module adapted to receive the parking brake signal and the service brake signal and control the parking brake indicator responsive to the service brake signal being outside a preferred service brake range.

In an embodiment of the present invention, a vehicle is disclosed. The vehicle includes a vehicle body, an operator cab located on the vehicle body, and a ground engaging system. The ground engaging system provides motive power to the vehicle body, and has at least one wheel, at least one service brake and at least one parking brake associated with the wheel, and a braking control system associated with the service brake and the parking brake. The braking control system includes a parking brake control adapted to produce a parking brake signal responsive to an operator command, a service brake sensor adapted to produce a service brake signal, a speed sensor adapted to produce a vehicle speed signal, and an electronic control module. The electronic control module is adapted to receive the parking brake signal, the service brake signal, and the vehicle speed signal and at least one of: responsively control the service brake such that the service brake is actuated in response to the vehicle speed signal being outside a preferred vehicle speed range, and prevent the parking brake from disengaging in response to the service brake signal being outside a preferred service brake range.

DETAILED DESCRIPTION

Figure 1:
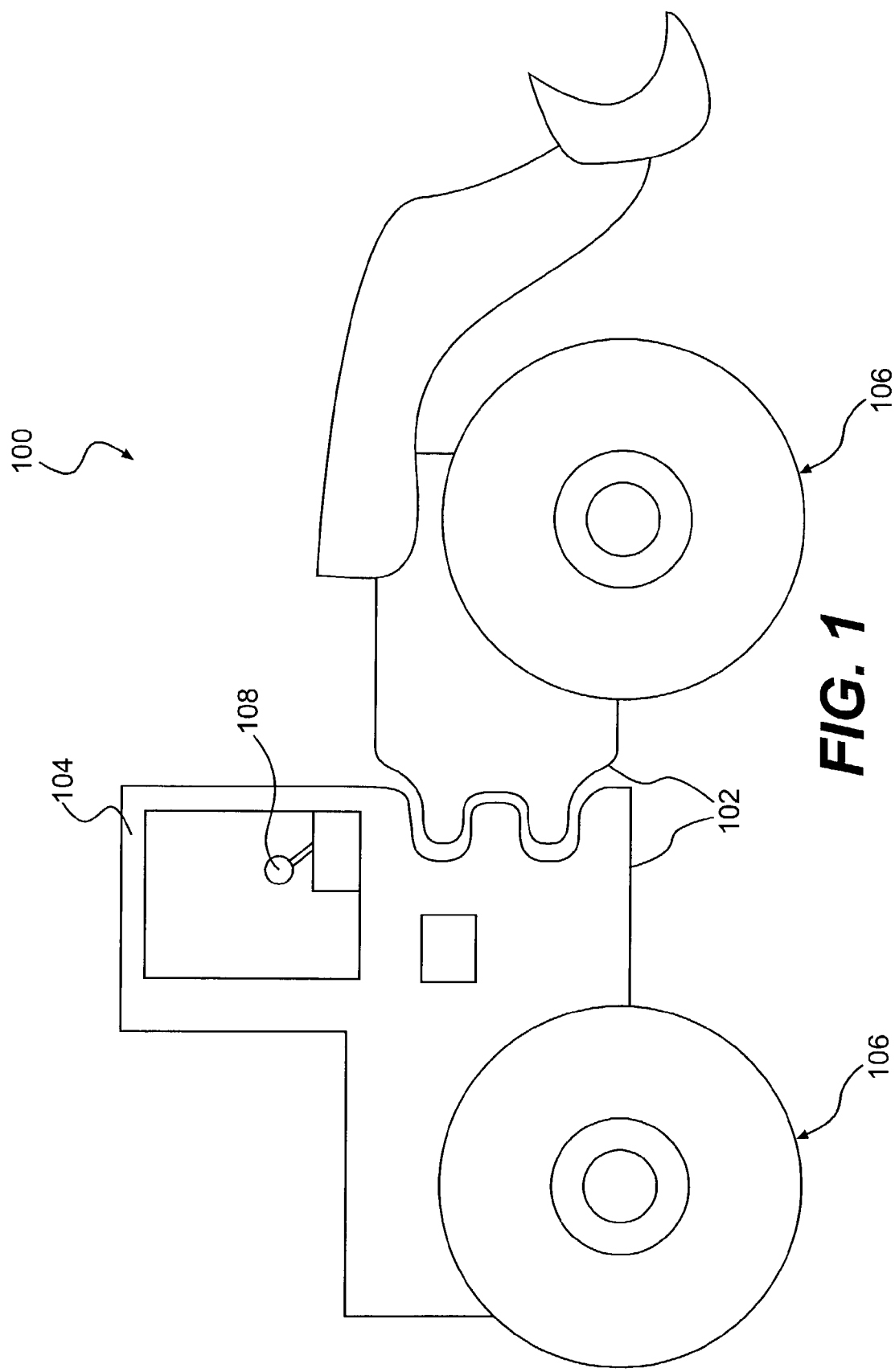
FIG. 1 is a side view of a vehicle incorporating an embodiment of the present invention.

FIG. 1 depicts a vehicle 100 incorporating a brake control system. The vehicle 100 includes a vehicle body 102, which includes an operator cab 104, and a ground engaging system, shown generally at 106.

Figure 2:
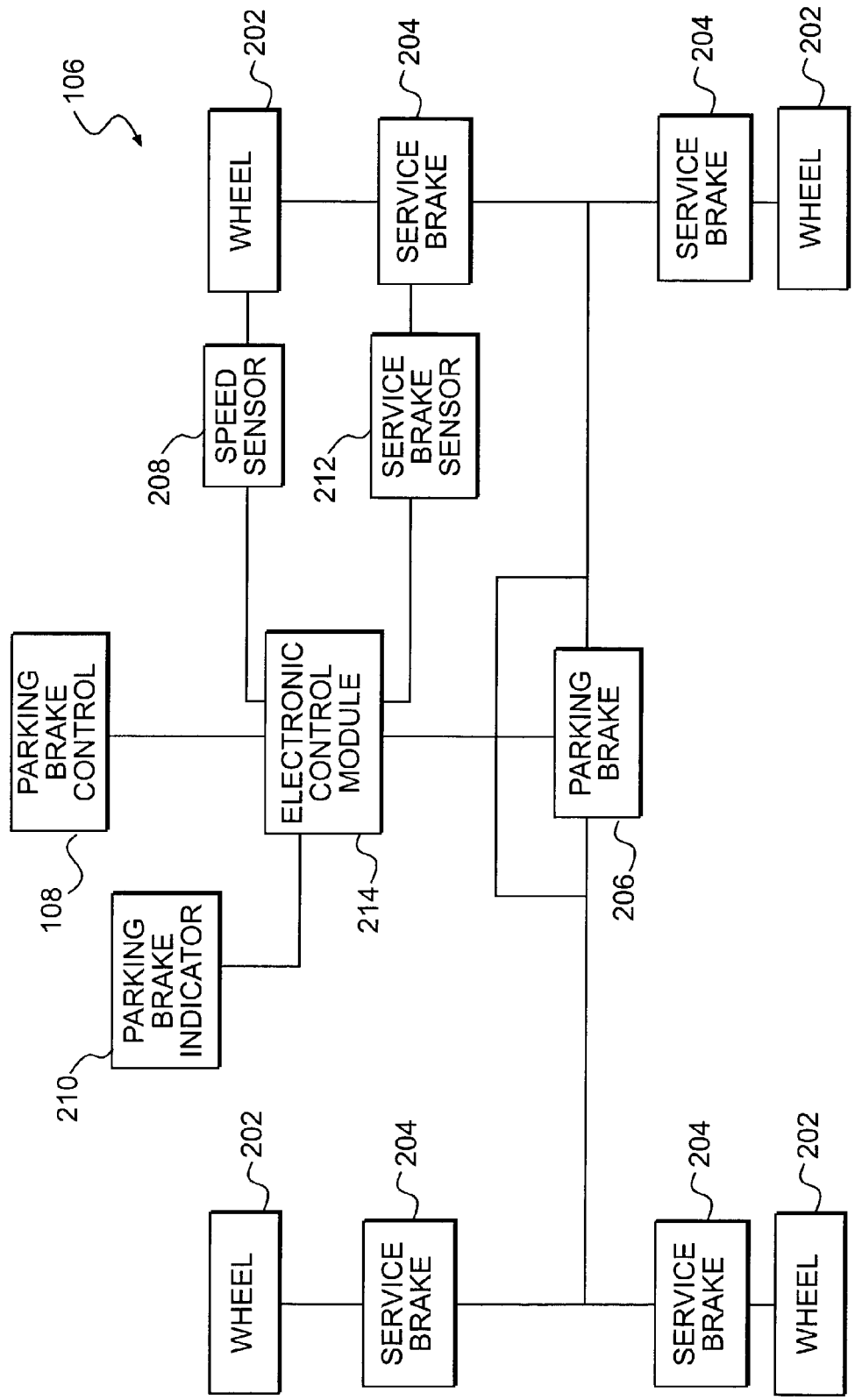
FIG. 2 is a schematic of a ground engaging system including an embodiment of the present invention.

The ground engaging system 106 provides motive power to the vehicle 100 and is depicted in greater detail in FIG. 2. The ground engaging system 106 has at least one wheel 202, at least one service brake 204 associated with a wheel 202 and at least one parking brake 206 associated with a wheel 202, and a braking control system associated with the service brake 204 and the parking brake 206. For exemplary purposes, parking brake control 108 is shown in FIG. 1.

The service brake 204 and parking brake 206 each act to resist motion of at least one wheel 202 and thereby to resist motion of the vehicle 100. The service brake 204 and the parking brake 206 may act upon the same wheel 202 or alternately upon different wheels 202. The service brakes 204 and parking brake 206 are shown and described as hydraulically operated, but may be of any suitable type known in the art.

The braking control system includes at least one speed sensor 208 to indicate a ground or travel speed of the vehicle 100. The speed sensor 208 shown in FIG. 2 is an example of a type which reads the speed of one or more wheels 202 to determine the vehicle speed, but the method of determining the vehicle speed is not essential to the present invention.

An operator of the vehicle 100 manipulates a parking brake control 108 to command engagement and disengagement of the parking brake 206. The parking brake control 108 is well-known in the art and may be a pedal, lever, dial, toggle, or the like. The parking brake control 108 produces a parking brake signal representative of the operator's command. An operator parking brake indicator 210, such as a light, dial, LCD display, or the like, is preferably provided to show the operator the current status of the parking brake 206.

Preferably, a service brake sensor 212 monitors a pre-fill state or some other condition which indicates that at least one service brake 204 is ready for use. The service brake sensor 212 may be a pressure sensor or any other device able to reliably produce a service brake signal.

The braking control system includes an electronic control module (ECM) 214 adapted to receive the parking brake signal, the vehicle speed signal, and, if provided, the service brake signal. The ECM 214 controls the service brakes 204 and parking brake 206 in a known manner according to a predetermined scheme, detailed below, to produce a desired result.

Figure 3:
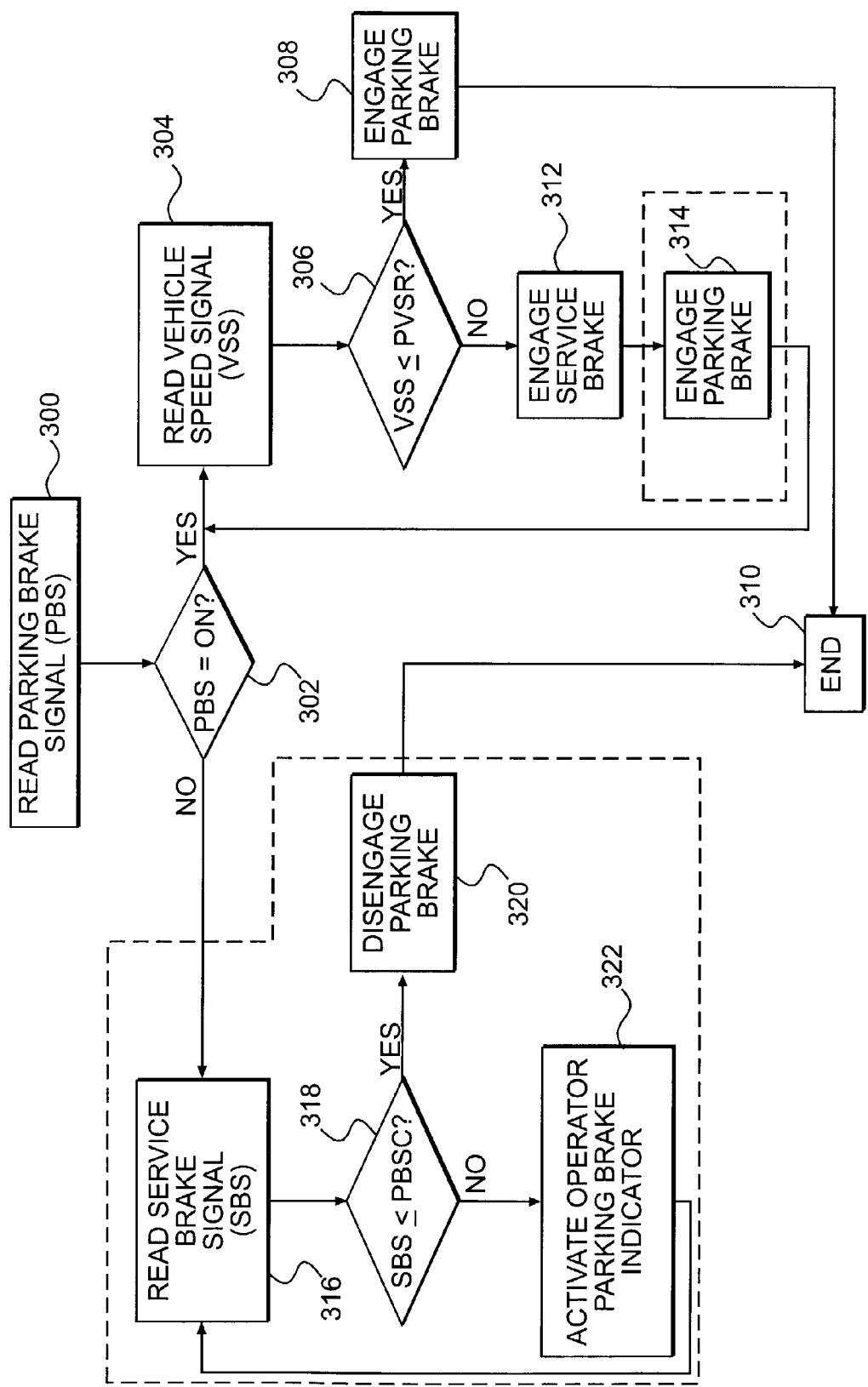
FIG. 3 is a flow chart of an embodiment of the present invention.

FIG. 3 is a flowchart depicting an embodiment of the present invention. When the braking control system is activated, which may be constantly or may be switched according to a manual or automatic signal such as a sensed manipulation/change in state of the parking brake control 108, control starts at first control block 300 and the parking brake signal (PBS) is read. The PBS may be indicated to the operator via the operator parking brake indicator 210 or via another informational display. The PBS may be produced continuously, intermittently, or may only be produced one time for each change in the operator command to the parking brake control 108. The exact nature of the PBS is not essential to the present invention. For descriptive purposes, it will be assumed herein that a single binary on/off PBS is produced responsive to a change in state of the parking brake control 108.

Control proceeds from first control block 300 to first decision block 302, and if the PBS indicates an operator command of "on", control proceeds to the second decision block 304, where the vehicle speed signal (VSS) is read. The next step of the braking control system occurs at second decision block 306, where the VSS is compared to the preferred vehicle speed range (PVSR). If the VSS is within the PVSR, the parking brake is engaged at third control block 308, and control ends the braking control system's logic at fourth control block 310.

If the VSS is not within the PVSR at second decision block 306, then control passes to fifth control block 312 and at least one service brake 204 is actuated. Preferably (as indicated by the dashed line), the parking brake 206 is also engaged at sixth control block 314 to help slow the vehicle 100 to the PVSR. Regardless, control returns from fifth control block 312 and/or sixth control block 314 to second control block 304, where the VSS is read anew. The loop thereby produced is continued until the VSS is within the PVSR and control passes to third control block 308 as described above.

Back to first decision block 302, if the PBS does not indicate a command of "on", the PBS is considered to have an "off" value and control proceeds to seventh control block 316. As indicated by the dashed lines, the left side of the FIG. 3 flowchart is optional; control may instead proceed to fourth control block 310 and end the logic of the braking control system.

At seventh control block 316, the service brake signal (SBS) is read. Control then passes to third decision block 318, where the SBS is compared to the preferred service brake condition range (PSBC). If the SBS is within the PSBC, control passes to eighth control block 320 and the parking brake 206 is disengaged. If the SBS is not within the PSBC, control proceeds to ninth control block 322, where the operator parking brake indicator 210 is activated. Control then returns to seventh control block 316 and continues to loop as shown, not disengaging the parking brake 206 until the SBS is within the PSBC.

INDUSTRIAL APPLICABILITY

The braking control system of the present invention is intended to protect the components of a parking brake 206 of a vehicle 100 from undue wear resulting from improper application while allowing an operator to maintain control of the vehicle 100 with the parking brake 206 and service brakes 204.

As the vehicle 100 travels, the operator may command the parking brake 206 to engage before the vehicle 100 comes to a complete stop. When a parking brake engage command is detected, the logic of FIG. 3 determines whether the vehicle speed is in a preferred vehicle speed range—for example, from zero to three miles per hour. If the vehicle speed is not within that range, the service brakes 204 will actuate instead of or in addition to the parking brake 206, until the vehicle speed is brought into the preferred vehicle speed range. The service brakes 204 may be disengaged once the vehicle speed is brought into the preferred vehicle speed range, or both the service brakes 204 and parking brake 206 may be engaged concurrently. When the vehicle speed is brought into the preferred vehicle speed range, the parking brake 206 is applied as the operator commanded.

When the vehicle 100 is stopped and the operator commands that the parking brake 206 be disengaged, a ready state of the service brakes 204 is preferably assessed. The service brake condition is then compared to a preferred service brake condition value or range to determine whether the service brakes 204 have pre-filled adequately or are otherwise in good condition to perform as intended without the assistance of the parking brake 206. If the service brakes 204 are not within the preferred range, optionally an operator parking brake indicator 210 informs the operator that the disengage command for the parking brake 206 has been received but that the parking brake 206 will not be disengaged until the service brake signal is within the preferred service brake condition range. This indication prevents the operator from the frustration of sending redundant and seemingly ignored commands to the vehicle 100. Once the service brake signal is within the preferred service brake condition range, the parking brake 206 is disengaged per the operator's command.

Other aspects, objects and advantages of this invention can be obtained from a study of the drawings, the disclosure and the appended claims.

What is claimed is:

1. A braking system for a vehicle comprising:
   a plurality of ground engaging wheels attached to and supporting a vehicle body;
   a service braking system associated with at least one of the wheels, the service braking system adapted to actuate a brake for slowing the vehicle from a moving state to a stationary state;
   a parking braking system associated with at least one of the wheels, the parking braking system being separate from the service braking system, the parking braking system adapted to actuate a brake while the vehicle is stationary to hold the vehicle in a stationary position;
   a braking control system associated with the service braking system and the parking braking system, the braking control system including:
      a parking brake control adapted to produce a parking brake signal in response to an operator command to actuate the parking braking system;
      a speed sensor adapted to produce a vehicle speed signal; and
      an electronic control module (ECM) adapted to receive the parking brake signal and the vehicle speed signal;
      wherein when the ECM receives the parking brake signal and the vehicle speed signal indicates that the vehicle is moving at greater than a first speed, the ECM actuates the service braking system.

2. A braking system for a vehicle according to claim 1 further comprising:
   a parking brake which is actuated by the parking braking system; and
   a service brake which is actuated by the service braking system and is separate from the parking brake.

3. A braking system for a vehicle according to claim 1 wherein the ECM deactuates the service braking system when the vehicle speed signal indicates that the vehicle is moving less than a second speed.

4. A braking system for a vehicle according to claim 3 wherein the second speed is the same as the first speed.

5. A braking system for a vehicle according to claim 1 wherein:
   when the ECM receives the parking brake signal and the vehicle speed signal indicates that the vehicle is moving at greater than a first speed, the ECM actuates the parking braking system and the service braking system.

6. A braking system for a vehicle according to claim 1 wherein:
   when the vehicle speed signal indicates that the vehicle is moving at less than a second speed, the ECM actuates the parking braking system and deactuates the service braking system.

7. A braking system for a vehicle according to claim 6 wherein the second speed is the same as the first speed.

8. A braking system for a vehicle comprising:
   a plurality of ground engaging wheels attached to and supporting a vehicle body;
   a service brake associated with at least one of the wheels, the service brake adapted for slowing the vehicle from a moving state to a stationary state;
   a parking brake associated with at least one of the wheels, the parking brake being separate from the service brake, the parking brake adapted for engagement while the vehicle is stationary to hold the vehicle in a stationary position;
   a braking control system associated with the service brake and the parking brake, the braking control system including:
      a parking brake control adapted to produce a parking brake signal in response to an operator command to actuate the parking brake;
      a speed sensor adapted to produce a vehicle speed signal; and
      an electronic control module (ECM) adapted to receive the parking brake signal and the vehicle speed signal;
      wherein when the ECM receives the parking brake signal and the vehicle speed signal indicates that the vehicle is moving at greater than a first speed, the ECM actuates the service brake.

9. A braking system for a vehicle according to claim 8 wherein the ECM deactuates the service brake when the vehicle speed signal indicates that the vehicle is moving less than a second speed.

10. A braking system for a vehicle according to claim 9 wherein the second speed is the same as the first speed.

11. A braking system for a vehicle according to claim 8 wherein:
    when the ECM receives the parking brake signal and the vehicle speed signal indicates that the vehicle is moving at greater than a first speed, the ECM actuates the parking brake and the service brake.

12. A braking system for a vehicle according to claim 8 wherein:
    when the vehicle speed signal indicates that the vehicle is moving at less than a second speed, the ECM actuates the parking brake and deactuates the service brake.

13. A braking system for a vehicle according to claim 12 wherein the second speed is the same as the first speed.

* * * * *